UNITED STATES PATENT OFFICE.

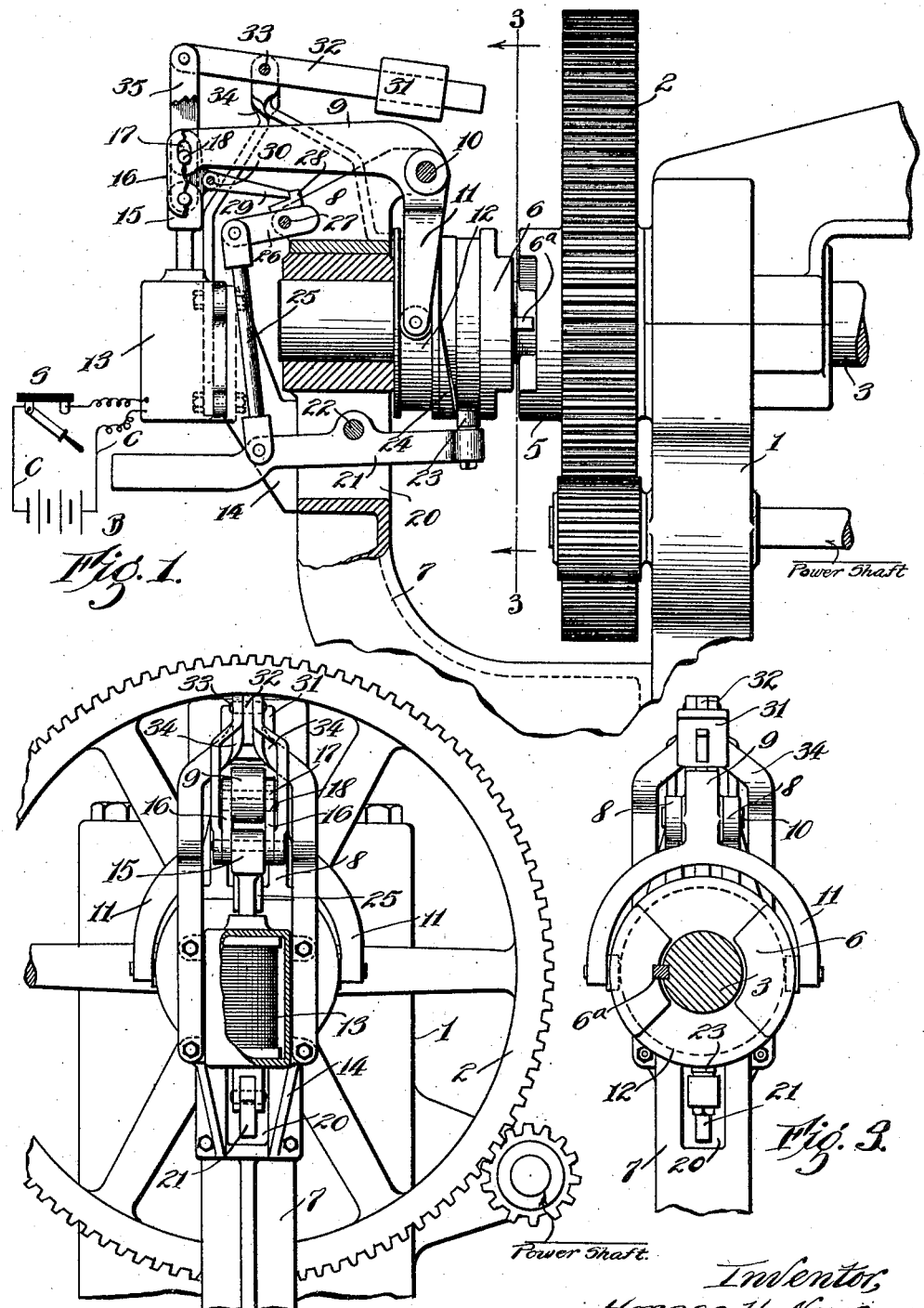

HORACE H. NEWSOM, OF CLEVELAND, OHIO, ASSIGNOR TO THE STANDARD PARTS COMPANY, OF CLEVELAND, OHIO, A CORPORATION OF OHIO.

CLUTCH MECHANISM.

1,310,629.     Specification of Letters Patent.     Patented July 22, 1919.

Application filed July 28, 1917. Serial No. 183,221.

*To all whom it may concern:*

Be it known that I, HORACE H. NEWSOM, a citizen of the United States, residing at Cleveland, in the county of Cuyahoga and State of Ohio, have invented a certain new and useful Improvement in Clutch Mechanism, of which the following is a full, clear, and exact description, reference being had to the accompanying drawings.

This invention relates to clutch mechanism, particularly to mechanism for engaging and automatically disengaging clutches of power driven machines, such as power presses.

The objects of the invention are to provide comparatively simple mechanism of the above character that is positive of operation; is durable; is not likely to get out of order; is preferably current actuated so that it may be easily controlled from a distant point; and which comprises, besides two clutch members, means for positively engaging the members, means normally situated to disengage the members, and an actuating device operable to first remove the disengaging means from normal position and to subsequently actuate the engaging means the same being of a nature insuring such a sequence of operations.

An embodiment of my invention wherein the foregoing objects are attained is illustrated in the accompanying drawing.

Figure 1 is a fragmentary elevation of a power press showing an installation of my invention; Fig. 2 is an elevation from the left of Fig. 1; and Fig. 3 is a section on the line 3—3 of Fig. 1, looking in the direction of the arrows.

In the drawing, the frame of the machine (which is shown in part) is designated 1, the driving element 2, and the driven element 3. In the present instance, these respective parts are the frame or housing of a power press, the driving gear, and the crank shaft whereon the gear is loosely mounted.

One end of the hub of the driving element or gear 2 has its hub radially notched to produce a clutch member 5. The other clutch member, shown at 6, is slidable upon the driven element or shaft 3 between the driving element or gear 2 and a bracket 7 that is shown as secured to and extending outward and upward from the frame 1, the extreme outer end of the driven element or shaft 3 being journaled within the head of this bracket. The head of the bracket is provided with an extension 8 which projects upward and over the clutch member 6, the extension comprising two side plates between which the angle of a bell crank lever 9 is journaled upon a pin 10 that is supported by the extension. One arm of the bell crank lever is bifurcated to form a fork 11 which embraces the clutch member 6, the ends of the fork being provided with anti-friction rollers which ride within the groove 12 of the clutch member, in accordance with the usual construction of devices of this character. It will be readily seen that, when the rear end of the bell crank lever is drawn downward, the clutch member 6 is moved by the action thereof into engagement with the clutch member 5. In the present form of my invention, the bell crank is adapted to be rocked in the manner just described by a solenoid 13 that is supported by a member 14 from the bracket 7, and the core of the solenoid has a head 15 that is connected, through opposed links 16, with the end of the horizontal arm of the bell crank lever. It will be observed that the links 16 are provided with slots 17 within which project the ends of a pin 18 that is carried by the bell crank lever. A lost motion connection is thus provided between the head and bell crank lever which allows the core of the solenoid to move somewhat in advance of said lever, or before any movement of the lever is effected.

Extending through a slot 20 in the bracket 7 and horizontally beneath the clutch member 6 is a lever 21 that is pivoted upon a pin 22 supported by the bracket. The lever 21 carries a roller 23 that is adapted to be engaged by the side of a cam 24 that is secured to the clutch member 6. When the lever 21 is in normal position its end carrying the roller 23 is elevated so that said roller is in the plane of the cam 24. Near its opposite end the lever 21 is connected by a link 25 to a rocker arm 26 pivoted upon a pin 27 supported by and between the plates of the extension 8. The end of the rocker arm opposite its connection with the link 25 is provided with a lug 28 for engagement by a pawl 29 that is pivoted at 30 between the links 16 carried by the head of the solenoid core. When the parts are in normal position, as shown in the drawing, the pawl 29 is in engagement with the lug 28 and extends upward and away from the same, and the head 15 of the solenoid core, with the links 16, is elevated so that the ends of the pin 18 repose within the lower ends of the slots 17. The parts are retained in this condition, when the solenoid is not energized, by a weight 31 on a lever 32 fulcrumed upon a pin 33 supported by a bracket 34 which rises above the bracket 7 and is supported from the extension 8 and member 14, the end of the lever 32 opposite the weight 31 being connected by links 35 to the head 15 of the solenoid core.

In the operation of the mechanism, current may be supplied to the solenoid 13 from a suitable source of electric energy, as a battery B, by closing the switch S, situated in one leg of a circuit represented by the wires C. Thereupon the solenoid will be energized, causing it to suck inward its core to draw downward the head 15. The initial movement of the head straightens out into a horizontal position the pawl 29 thus swinging the rocker arm 26 upon its pivot to elevate the link 25 and, through it, the outer end of the lever 21. This results in a depression of the opposite end of the lever and a removal of the roller 23 from the cam 24. By this time, the upper ends of the slots 17 have engaged the pin 18, and further descent of the head 15 swings the bell crank lever 9 in a direction to move the clutch member 6 into engagement with the clutch member 5, this action being permitted by reason of the withdrawal of the roller 23 from the cam 24, as just explained. It will be understood that the clutch member 6 is splined to the shaft 3, as by the key $6^a$, Fig. 3, in accordance with common practice, so that the shaft or driven element is not rotated with the driving element or gear 2. Immediately after this operation has been performed, the switch S is opened and the solenoid consequently deënergized (it being obviously within the scope and practical working of my invention to substitute, for the manually actuated switch herein disclosed, a circuit opening and closing device controlled automatically by some moving part of the machine or other agent, to open and, if desired, to close the circuit). Upon the solenoid being deënergized, its core, with the head 15 and links 16, is elevated or returned to normal condition by the weight 31, as previously explained. The depressing effect of the weight 31 is sufficient only to elevate the head and core to an extent permitted by the length of the slots 17, such being sufficient to return the pawl 29 to its inclined position and allow the rocker arm 26 to drop the link 25 and the outer end of the lever 21 to elevate the roller 23 thereof into the path of the cam 24. Consequently, as the clutch member 6 rotates, the cam 24 will ride along the roller 23 causing the roller to withdraw the clutch member 6 from engagement with the clutch member 5.

Having thus described my invention, what I claim is:—

1. In mechanism of the character set forth, the combination with a driven and a driving element, of a pair of clutch members operatively connected to said elements, and one of which is movable toward and from the other, a lever pivotally supported intermediate its ends and having one end operatively connected to the movable clutch member, an electro-magnetic device having a lost motion connection with the opposite end of the lever whereby said device is capable of initial movement without affecting said lever, the movable clutch member having a cam portion, a member having a part wherewith the cam portion of the movable clutch member is adapted to engage thereby to withdraw said member from engagement with the other clutch member, a pivotally supported arm having a lateral extension, operative connections between said arm and the aforesaid member whereby an oscillation of the arm will effect a movement of said member in a direction to withdraw its aforesaid part from cam engaging position, a pawl pivotally connected to the electro-magnetic device and adapted to engage the lateral extension of the aforesaid arm, the normal distance between the path of movement of the pivoted end of said pawl and the aforesaid lateral extension being less than the length of the pawl wherefore the initial movement of the electro-magnetic device will rock the arm to withdraw the cam engaging part of the aforesaid member from cam engaging position.

2. In mechanism of the character set forth, the combination with a driven and a driving element, of a pair of clutch members operatively connected to said elements, and one of which is movable toward and from the other, a lever pivotally supported intermediate its ends and having one end operatively connected to the movable clutch member, an electro-magnetic device having a lost motion connection with the opposite end of the lever whereby said device is capable of initial movement without affecting said lever, the movable clutch member having a cam portion, a member having a part wherewith the cam portion of the movable clutch member is adapted to engage thereby to withdraw said member from engagement with the other clutch member, and operative connections between the electro-magnetic device and said member whereby the initial movement of said device will move the member to withdraw its cam engaging part from cam engaging position.

3. In mechanism of the character set forth, the combination with a driven and a driving element, of a pair of clutch members operatively connected to said elements, and one of which is movable toward and from the other, means for shifting the movable clutch member into engagement with the other clutch member, an electro-magnetic device having a lost motion connection with said means whereby said device is capable of initial movement without affecting said means, the movable clutch member having a cam portion, a member having a part wherewith the cam portion of the movable clutch member is adapted to engage thereby to withdraw said member from engagement with the other clutch member, a pivotally supported arm, operative connections between said arm and the aforesaid member whereby an oscillation of the arm will effect a movement of said member in a direction to withdraw its aforesaid part from cam engaging position, and a thrust member interposed between the electro-magnetic device and a part of said arm whereby said arm will be oscillated upon the initial movement of the electro-magnetic device.

4. In mechanism of the character set forth, the combination with a driven and a driving element, of a pair of clutch members operatively connected to said elements, and one of which is movable toward and from the other, a lever pivotally supported intermediate its ends and having one end operatively connected to the movable clutch member, an electro-magnetic device having a lost motion connection with the opposite end of the lever whereby said device is capable of initial movement without affecting said lever, the movable clutch member having a cam portion, a member having a part wherewith the cam portion of the movable clutch member is adapted to engage thereby to withdraw said member from engagement with the other clutch member, a pivotally supported arm, operative connections between said arm and the aforesaid member whereby an oscillation of the arm will effect a movement of said member in a direction to withdraw its aforesaid part from cam engaging position, and a thrust member so disposed between said arm and the electro-magnetic device as to cause the initial movement of said device to oscillate the arm.

In testimony whereof, I hereunto affix my signature.

HORACE H. NEWSOM.

Copies of this patent may be obtained for five cents each, by addressing the "Commissioner of Patents, Washington, D. C."